(12) United States Patent
Hansen

(10) Patent No.: US 12,448,080 B2
(45) Date of Patent: Oct. 21, 2025

(54) TRANSMISSION FOR LEVER-DRIVEN CYCLE

(71) Applicant: Gordon Harold Hansen, Tallahassee, FL (US)

(72) Inventor: Gordon Harold Hansen, Tallahassee, FL (US)

( * ) Notice: Subject to any disclaimer, the term of this patent is extended or adjusted under 35 U.S.C. 154(b) by 647 days.

(21) Appl. No.: 17/945,360

(22) Filed: Sep. 15, 2022

(65) Prior Publication Data

US 2024/0092452 A1 Mar. 21, 2024

(51) Int. Cl.
*B62M 1/24* (2013.01)
*B62M 1/30* (2013.01)
B60B 27/02 (2006.01)
B62K 3/06 (2006.01)
B62K 19/32 (2006.01)
B62K 19/36 (2006.01)
B62M 11/02 (2006.01)

(52) U.S. Cl.
CPC ............... *B62M 1/30* (2013.01); *B62M 1/24* (2013.01); *B60B 27/023* (2013.01); *B60Y 2200/13* (2013.01); *B62K 3/06* (2013.01); *B62K 19/32* (2013.01); *B62K 19/36* (2013.01); *B62M 11/02* (2013.01)

(58) Field of Classification Search
CPC .......... B62M 1/30; B62M 11/02; B62M 1/24; B60Y 2200/13; B62K 3/06; B62K 15/00; B62K 19/24; B62K 19/32; B62K 19/36; B62K 2015/001; B60B 27/023
See application file for complete search history.

(56) References Cited

U.S. PATENT DOCUMENTS

| | | | | | |
|---|---|---|---|---|---|
| 3,954,282 | A * | 5/1976 | Hege | ............... | B62M 1/28 280/251 |
| 5,415,422 | A * | 5/1995 | Trammell, Jr. | .......... | B62M 1/26 74/68 |
| 5,486,015 | A * | 1/1996 | Lau | ............... | B62K 3/005 280/282 |
| 6,173,981 | B1 * | 1/2001 | Coleman | ............... | B62K 3/002 280/253 |
| 6,298,740 | B1 * | 10/2001 | Bridges | ............... | F16H 29/04 74/120 |
| 7,487,987 | B2 * | 2/2009 | Yan | ............... | B62M 1/30 280/282 |
| 8,216,103 | B1 * | 7/2012 | Boczula | ............... | B62K 3/005 475/14 |
| 8,272,655 | B2 * | 9/2012 | Kim | ............... | B62M 1/30 280/238 |
| 8,899,605 | B2 * | 12/2014 | Kim | ............... | B62K 3/002 280/253 |
| 9,428,244 | B2 * | 8/2016 | Sobolewski | ............... | B62M 1/24 |
| 9,677,416 | B2 * | 6/2017 | Weber | ............... | B62K 3/002 |

(Continued)

*Primary Examiner* — Valentin Neacsu
*Assistant Examiner* — Marlon A Arce
(74) *Attorney, Agent, or Firm* — J. Wiley Horton

(57) ABSTRACT

A combination driving hub and transmission for a cycle—such as a bicycle. The inventive hub is preferably installed on the rear of a bicycle. A pair of reciprocating cranks provide input torque to corresponding input shafts. These input shaft transmit the torque through a series of step-up shafts. The step-up shafts increase the speed of the initial input—finally delivering the torque to an output shaft. The output shaft is preferably the hub of the bicycle's rear wheel.

20 Claims, 8 Drawing Sheets

(56) References Cited

U.S. PATENT DOCUMENTS

| | | | |
|---|---|---|---|
| 9,677,650 B2* | 6/2017 | Nichols | B62M 6/45 |
| 9,815,518 B2* | 11/2017 | Zhou | B62K 3/005 |
| 2016/0023081 A1* | 1/2016 | Popa-Simil | B62J 45/412 |
| | | | 700/91 |
| 2021/0031873 A1* | 2/2021 | Calley | B62M 6/45 |
| 2023/0399075 A1* | 12/2023 | Athalye | F16D 61/00 |

* cited by examiner

TRANSMISSION FOR LEVER-DRIVEN CYCLE

BACKGROUND OF THE INVENTION

1. Field of the Invention

This invention relates to the field of pedal-powered vehicles. More specifically, the invention comprises a combination transmission and wheel hub.

2. Description of the Related Art

Pedal-powered vehicles include bicycles, tricycles, quad cycles, and the like. Most such vehicles are powered by a pair of rotating crank and pedal assemblies. The pedal assemblies provide power through one or more driving sprockets. A chain connects the driving sprockets to one or more driven sprockets located on the rear axle of the cycle.

The driven sprockets are concentrically arranged in a set—sometimes referred to as a cassette. The final drive ratio of the cycle is altered by moving the chain from one driven sprocket to another, typically using a derailleur mechanism. Many bikes also incorporate two or more driven sprockets of differing sizes. These arrangements allow a wide range in drive ratios. However, they also impose structural limitations on a bicycle.

The first limitation is the need to mount the driven sprockets. A transverse tube called a bottom bracket is often used to mount the assembly of the cranks and their connected driving sprockets. This bottom bracket is located at an intersection between a seat tube, a down tube, and a pair of chain stays. The forces used to propel the bicycle must be transmitted to a wheel—typically the rear wheel. However, a significant amount of force placed on the frame occurs at the bottom bracket. Thus, the frame must be strong in the vicinity of the bottom bracket—adding weight and complexity.

The second limitation is the need for the cranks—and the attached pedals—to travel in a circular motion. The rider is able to exert substantial force for only a portion of the pedal's arc of travel. Substantial force may be imparted in the down stroke. If the rider uses toe clips or straps then substantial force may be imparted during the up stroke as well. However, the forward ("over the top") and rearward ("under the bottom") portions of the stroke are not nearly as useful for transmitting torque—since the muscles of the human leg are not configured to exert significant force in the directions needed during these portions of the rotational motion.

It is desirable to provide an input mechanism that only travels through a range of motion where the human leg can exert substantial force. It is also desirable to provide an input mechanism that delivers work directly to the driven hub rather than requiring a transfer through a chain or other device. The present invention provides such a system.

BRIEF SUMMARY OF THE PRESENT INVENTION

The present invention comprises a combination driving hub and transmission for a cycle—such as a bicycle. The inventive hub is preferably installed on the rear of a bicycle. A pair of reciprocating cranks provide input torque to corresponding input shafts. These input shaft transmit the torque through a series of step-up shafts. The step-up shafts increase the speed of the initial input—finally delivering the torque to an output hub. The output hub is preferably the hub of the bicycle's rear wheel.

Figure 1:
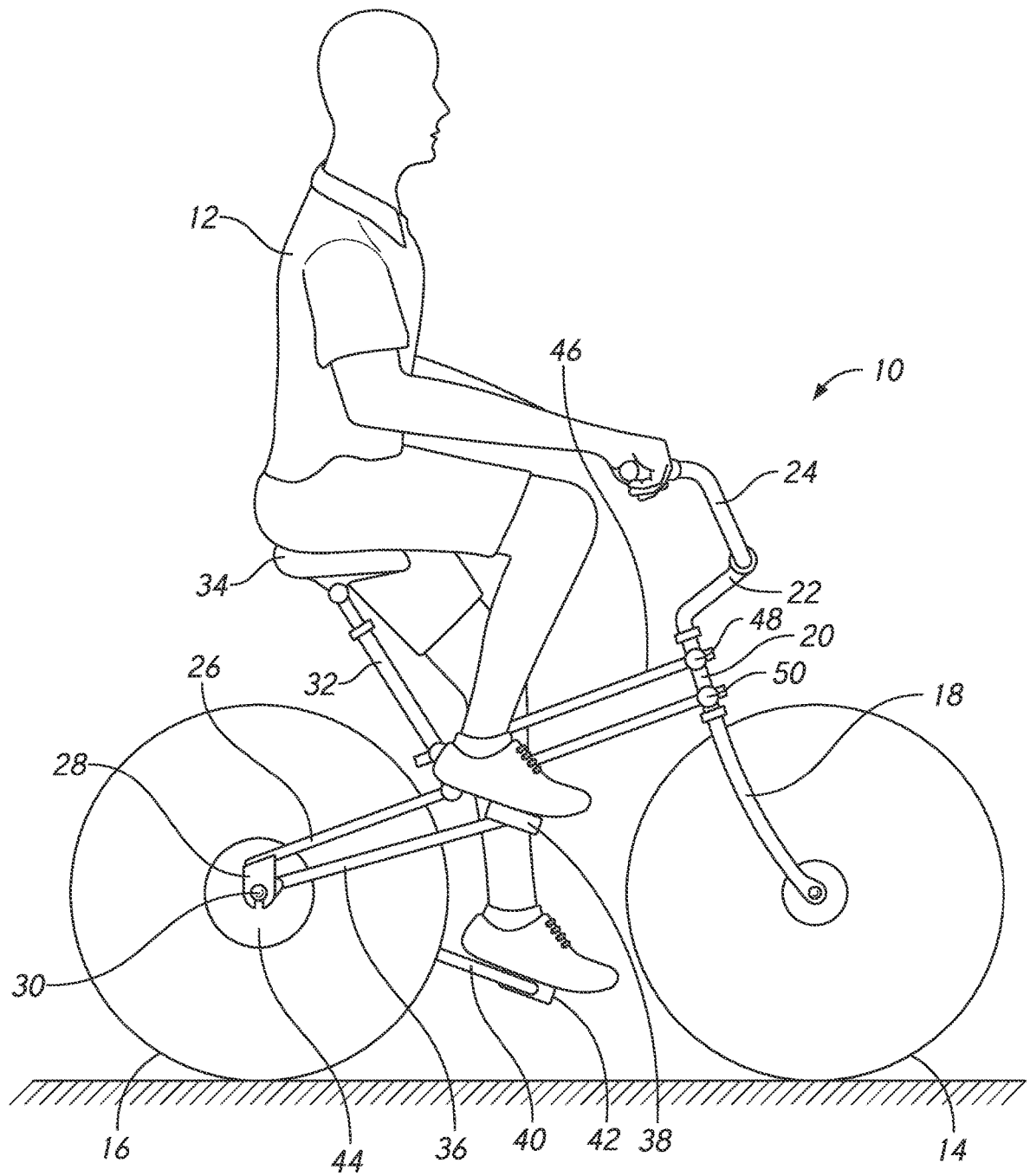
FIG. 1 is an elevation view, showing a user riding a bicycle embodiment of the present invention.

REFERENCE NUMERALS IN THE DRAWINGS 10 bicycle
12 user
14 front wheel
16 rear wheel
18 fork
20 head tube
22 stem
24 handlebars
26 lower span tube
28 axle bracket
30 rear axle
32 seat tube
34 seat
36 right crank
38 right pedal
40 left crank
42 left pedal
44 hub transmission
46 upper span tube
48 upper cross tube
50 lower cross tube
52 right vertical passage
54 left vertical passage
56 bolt
58 bolt
60 right upper longitudinal passage
62 right lower longitudinal passage
64 left upper longitudinal passage
66 left lower longitudinal passage
68 bolt passage
70 bolt passage
72 nut
74 spacer
76 spacer
78 spacer
80 bolt passage
82 bolt passage
84 bolt passage
86 bolt passage
88 spoke 90 left one-way clutch
92 right one-way clutch
94 left input shaft
96 right input shaft
98 bearing
100 bearing
102 left gear flange
103 left first gear
104 right gear flange
106 left gear interface
108 left second gear
110 left first step-up shaft
112 left third gear
114 gear interface
116 left fourth gear
118 left second step-up shaft
120 left fifth gear
122 left carrier
124 right carrier
126 gear interface
127 left sixth gear
128 output hub
130 spoke flange
132 axle center
134 first step-up shaft center
136 second step-up shaft center
138 package frame
140 package

DETAILED DESCRIPTION OF THE INVENTION

The present invention can be applied to many different types of pedal-powered vehicles. The drawing figures illustrate embodiments adapted for use in a bicycle. However, the reader should bear in mind that the scope of the invention is limited by the claims rather than the specific embodiments described and illustrated.

FIG. 1 depicts an elevation view of the present invention as applied to a bicycle 10. The inventive hub transmission 44 is centered on the rear axle 30 of rear wheel 16. Two crank/pedal assemblies extend forward from hub transmission 44. Right crank 36 extends forward from the right side of the hub transmission. Right pedal 38 is pivotally mounted to the distal end of the right crank.

Left crank 40 extends forward from the left side of hub transmission 44. Left pedal 42 is pivotally mounted to the distal end of the left crank. The cranks 36,40 are configured to move through a reciprocating arc rather than a full circle. In the depiction of FIG. 1, left crank 40 is approximately at its lowest extent of travel while right crank 36 is approximately at its highest extent of travel. Mechanical stops limiting the range of travel can be provided in the transmission, on the bicycle frame, or in any other suitable location. These stops can be made adjustable if desired.

User 10 provides motive power by pressing down on a raised pedal until it reaches the bottom of its arc of travel. The torque thus furnished by the user is transmitted directly to hub transmission 44, without the need for a separate driving sprocket and chain. This feature allows for the simplification of the bicycle frame—as will now be described.

A frame employing the inventive transmission does not need a bottom bracket to mount the drive sprockets, and therefore does not need an extended seat tube, a down tube, and a pair of chain stays. This allows significant flexibility in frame design. Head tube 20 is provided in a conventional location. The head tube pivotally mounts fork 18—which of course connects to front wheel 14. Stem 22 extends upward from head tube 20 and mounts handlebars 24 in a conventional manner.

Upper cross tube 48 and lower cross tube 50 extend laterally from the head tube. These serve as mounting points for a pair of upper span tubes 46 and lower span tubes 26. The lower span tubes extend rearward all the way to the position of rear axle 30. Each lower span tube 26 includes an axle bracket 28—with one axle bracket being attached to the right end of rear axle 30 and another axle bracket 28 being attached to the left end of rear axle 30. Upper span tubes 46 extend rearward to the position of seat tube 32. Seat tube 32 extends upward as shown. A seat post and seat 34 is adjustably attached to seat tube 32.

Figure 2:
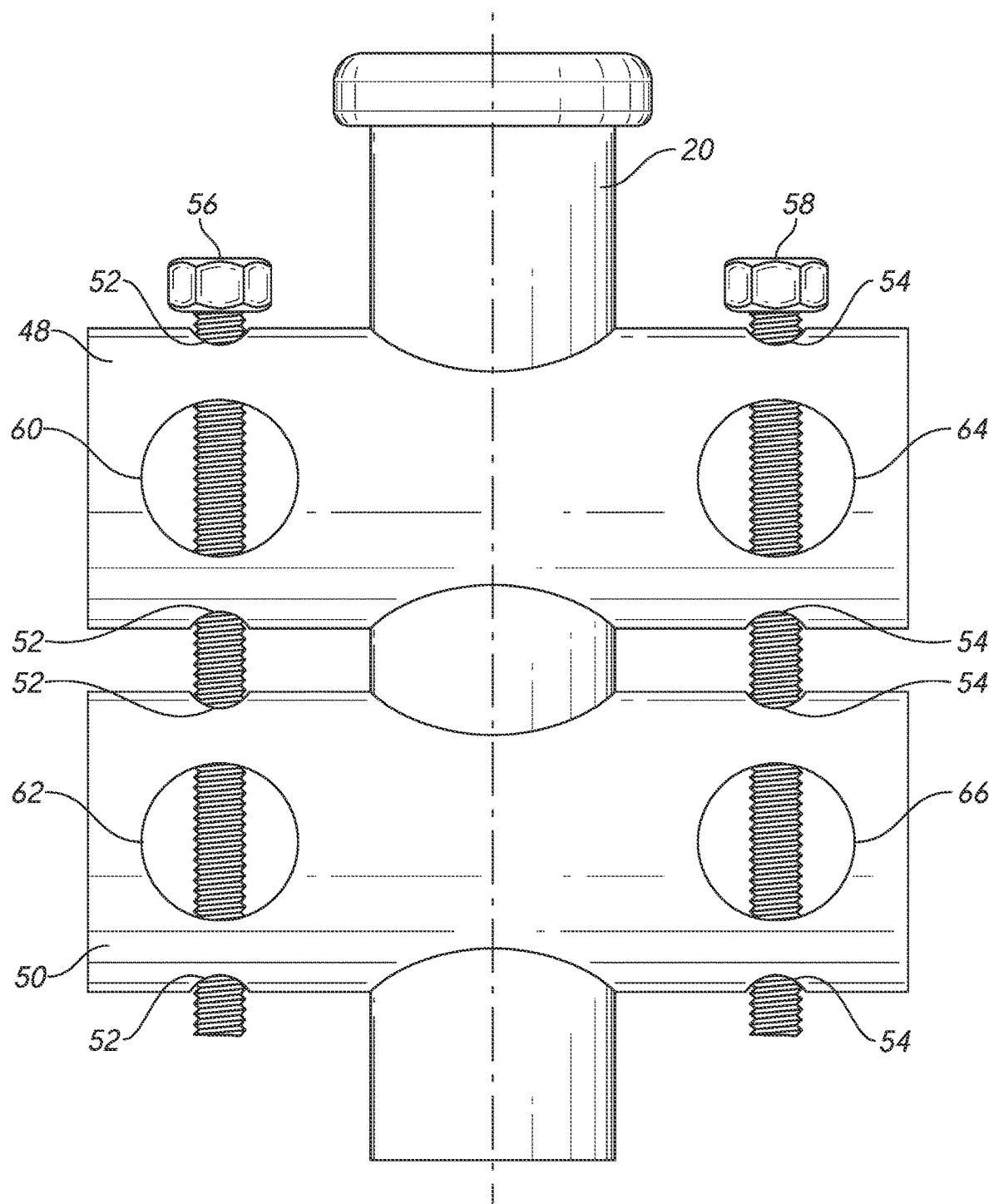
FIG. 2 is a detailed elevation view, showing the head tube region of the bicycle frame.
Figure 3:
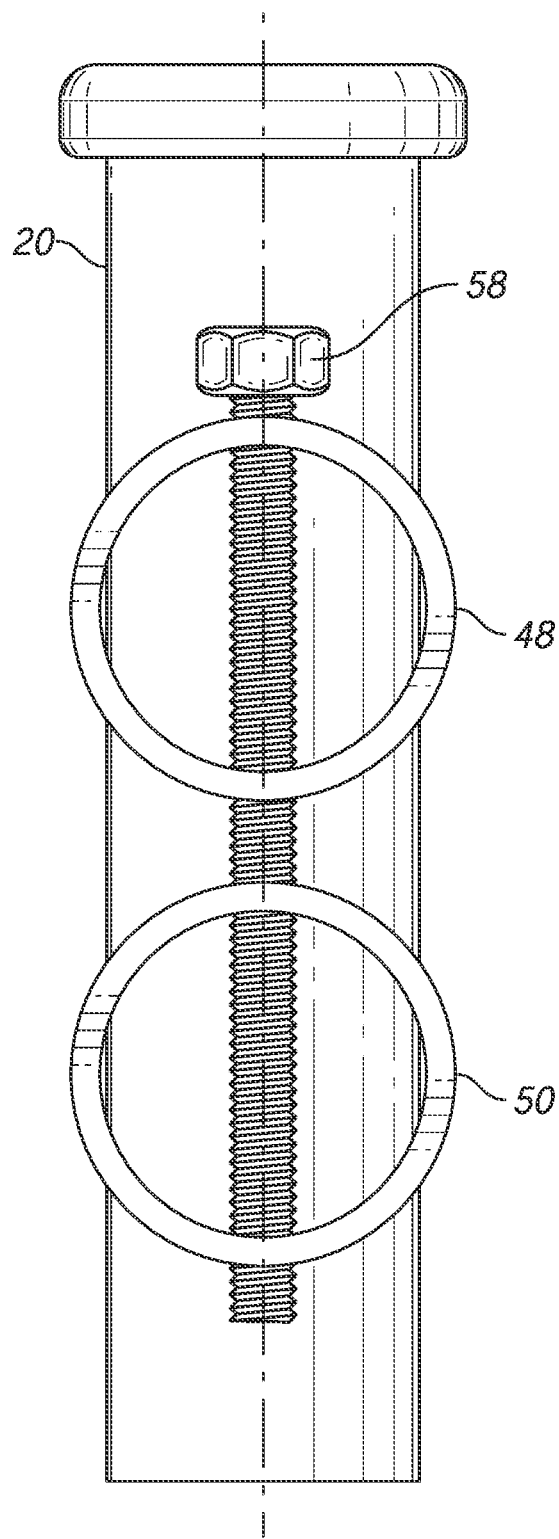
FIG. 3 is a detailed elevation view, showing the side of the assembly of FIG. 2.
Figure 4:
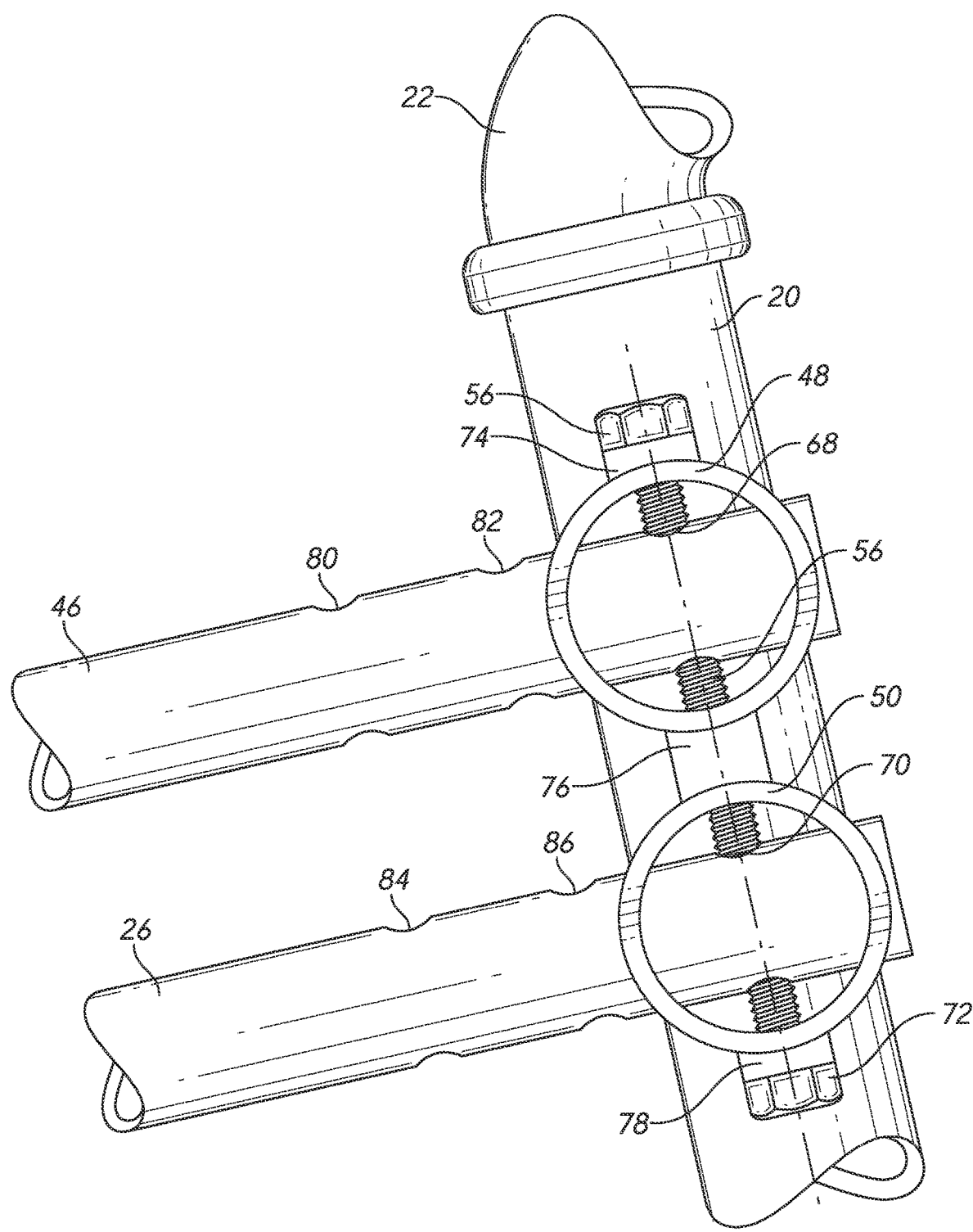
FIG. 4 is a detailed elevation view, showing the assembly of FIG. 3 with the addition of the upper and lower span tubes.

The present invention's ability to attach the drive cranks directly to the rear axle area allows the bicycle frame to be made modular for easy disassembly and storage (though a conventional welded frame may be used as well). FIGS. 2-4 show an approach to creating such a modular frame. FIG. 2 shows head tube 20 from the front—looking toward the rear. Upper cross tube 48 is perpendicular to head tube 20. Lower cross tube 50 is parallel to upper cross tube 48 and offset a distance downward. Right vertical passage 52 extends downward through the right side of the upper and lower cross tubes. It is sized to slidably receive bolt 56 as shown.

It is preferable—though by no means essential—to provide head tube 20, upper cross tube 48, and lower cross tube 50 as a weldment with weld seams running along the tube intersections. This provides a properly placed and suitably stiff assembly.

Left vertical passage 54 extends downward through the left side of the upper and lower cross tubes. It is sized to slidably receive bolt 58 as shown. The two cross tubes 48,50 also include four additional passages that are in this example perpendicular to the cross tubes and to the vertical passages 52,54. These are right upper longitudinal passage 60, right lower longitudinal passage 62, left upper longitudinal passage 64, and left lower longitudinal passage 66.

FIG. 3 shows a side elevation view of the same assembly as depicted in FIG. 3. The reader will observe the spacing of upper cross tube 48 and lower cross tube 50. The reader will also observe how bolt 58 passes downward through left vertical passage 54.

FIG. 4 shows the same assembly with the addition of the upper and lower span tubes. FIG. 4 also shows head tube 20 in an inclined state—its upper portion being further back than its lower portion. This inclined state is conventional for a bicycle frame, since it is needed to provide a centering tendency for the steering provided by the front wheel. The right upper span tube 46 is passed through right upper longitudinal passage 60 in upper cross tube 48 until such time as bolt passage 68 through the tube 46 aligns with bolt 56. Likewise, the right lower span tube 26 is passed through right lower longitudinal passage 62 in lower cross tube 50 until such time as bolt passage 70 aligns with bolt 56. Once the alignment is made, bolt 56 is passed through the passages to lock tubes 48,50,46,26 together. Nut 72 is tightened to secure the assembly.

It is preferable to provide spacers so that the tightening of nut 72 will not unduly compress the structure. Spacer 74 is provided beneath the head of bolt 56. This spacer has a cylindrical side conforming to the exterior of upper cross tube 48 and a central bore allowing the passage of the bolt's threaded shaft. Spacer 76 is provided between the two cross tubes 48,50. It has two cylindrical surfaces conforming to the tubes and a central bore allowing passage of the bolt.

Spacer 78 likewise has a cylindrical side and a central bore. Those skilled in the art will appreciate that the spacers 74,76,78 can be introduced laterally (traveling away from the viewer) and the bolt can be introduced vertically to pin the entire structure together. A set of left upper and lower span tubes are likewise connected to the left side of the upper and lower cross tubes in the same manner using analogous components.

Returning to FIG. 1, the reader will note the location of the intersecting structures proximate head tube 20. An analogous set of structure is preferably provided where seat tube 32 intersects the upper and lower span tubes 46,26. A second set of cross tubes are provided for the seat tube and additional bolts and spacers are used to connect these structures. Still looking at FIG. 1, those skilled in the art will appreciate that the size of the bicycle frame thus constructed can be varied by varying the distance between seat tube 32 and head tube 20.

Returning now to FIG. 4, one approach to varying the bicycle frame size will be disclosed. The upper span tube 46 contains a bolt passage 68 that is used to receive bolt 56. However, the upper span tube includes additional bolt passages 80,82 spaced at suitable intervals. Likewise, lower span tube 26 includes a bolt passage 70 and additional bolt passages 84,86 at suitable intervals. In order to shorten the frame, the user can choose to pass bolt 56 through another set of bolt passages—such as bolt passages 82 and 86. This will result in the span tube ends protruding further forward of the cross tubes 48,50 and the bicycle frame being shortened.

Figure 5:
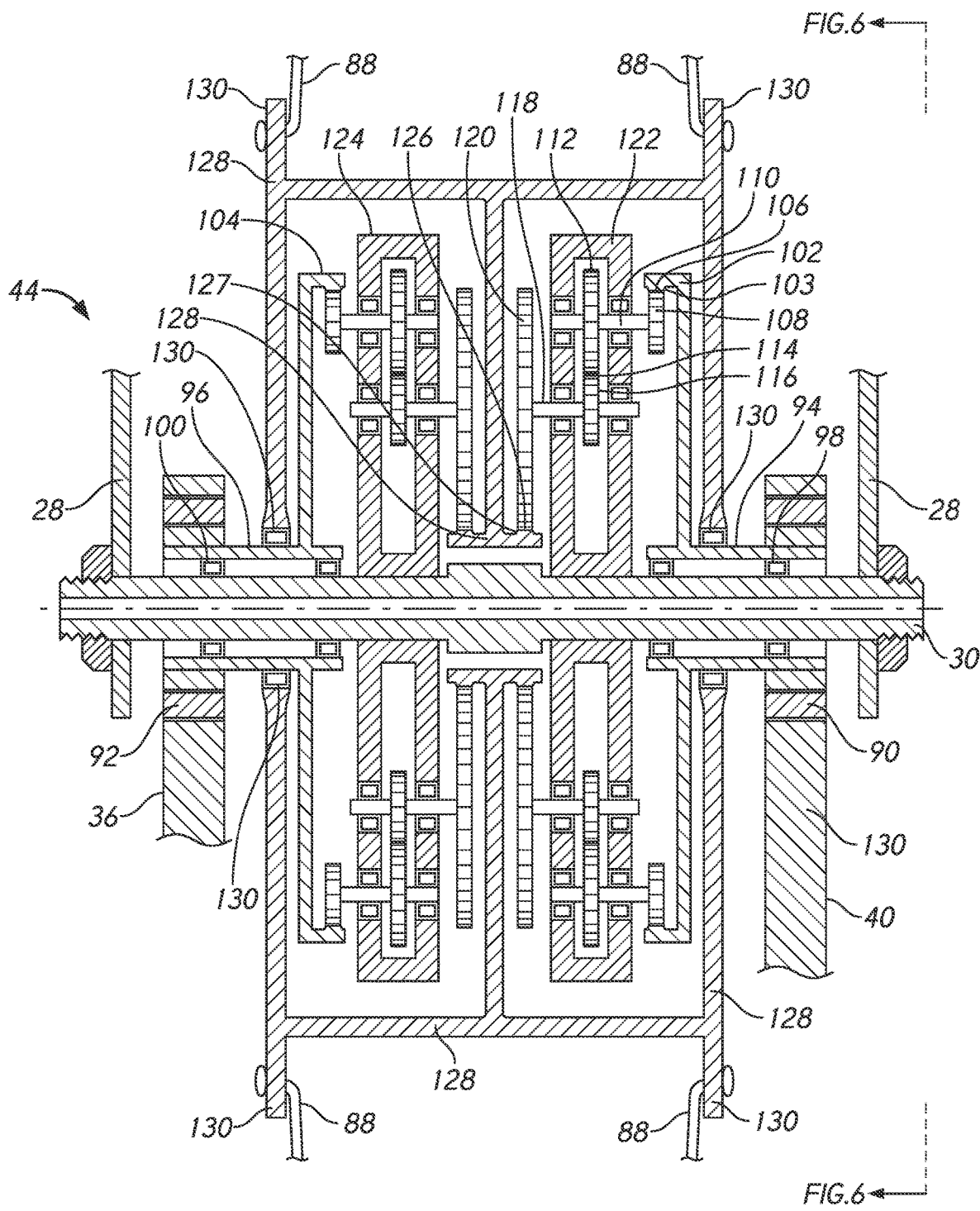
FIG. 5 is a sectional plan view, showing internal details of the inventive hub.

Having described some of the advantages provided by the inventive transmission, this disclosure now turns to the details of the transmission itself. FIG. 5 provides a horizontal section view through the inventive hub transmission 44. Rear axle 30 in this example is a stationary metal shaft. Each end of the axle is secured to an axle bracket 28—and hence to the frame of the bicycle. The attachment between the axle 30 and the axle brackets 28 is shown simplistically. This attachment can assume many forms and is not significant to the present invention.

The inventive transmission provides a stepped-up final drive ratio so that the arcuate motion of the final output shaft is greater than the arcuate motion of the cranks. The transmission includes a symmetric left and right side. The left side will be explained in detail, and the reader will understand that the right side is a mirror image of the left side.

FIG. 5 is a sectional view taken from the top looking down, with the forward direction of the bicycle lying at the bottom of the view and the left side of the bicycle lying at the right side of the view. Left crank is connected to left input shaft 94 by left one-way clutch 90. One-way clutch 90 only transmits torque from the left crank when the user is stepping down on the left pedal. When the user is raising the left crank one-way clutch 90 "free wheels" and no torque is transmitted from the left crank to left input shaft 94.

In this example, left input shaft 94 is rotationally mounted on rear axle 30 by bearings 98. The reader will note that roller bearing assemblies are used in this example to locate rotating components while minimizing friction. As these bearing assemblies are conventional, many are not labeled. Suffice it to say that the use of roller bearings allows left input shaft 94 to turn freely on rear axle 30.

Left input shaft 94 includes a left gear flange 102 extending outward a considerable distance. Left first gear 103 is an array of gear teeth facing inward from the left gear flange 102. These inward facing teeth of left first gear 103 engage left second gear 108. Left second gear 108 is fixedly mounted on left first step-up shaft 110. Left first step-up shaft 110 is rotationally mounted within left carrier 122 (again using roller bearings). Left carrier 122 is preferably stationary. In this example it is fixed to rear axle 30, which is preferably also stationary.

Left third gear 112 is fixedly mounted on left first step-up shaft 110, so that left third gear 112 rotates at the same rate as left second gear 108. Left third gear engages left fourth gear 116, which is fixedly mounted on left second step-up shaft 118. Left second step-up shaft 118 is rotationally mounted within left carrier 122.

Left fifth gear 120 is mounted on left second step-up shaft 118 so that left fifth gear 120 and left fourth gear 116 rotate at the same rate. In this example, left sixth gear 127 is another set of inward-facing gear teeth mounted on a circular flange on output hub 128. Left sixth gear 127 is driven by left fifth gear 120. The reader will note that output hub 128 is a large component that is rotationally mounted—again using roller bearings 130—on left input shaft 94 and right input shaft 96.

In this example output hub 128 assumes the role of a traditional bicycle wheel hub. Spoke flanges 130 extend outward from the outer perimeter of output hub 128. A plurality of laced spokes 88 connect spoke flanges 130 to the rim of the bicycle's rear wheel.

The torque path for the left side of the inventive transmission will now be described:

1. Torque is first transmitted from left crank 40 through left one-way clutch 90 to left input shaft 94, which spins freely on rear axle 30;
2. Torque is second transmitted from left first gear 103 on left gear flange 102 of left input shaft 94 to left second gear 108. This is referred to as left gear interface 106. The reader will note that the radius of left first gear 103 is approximately 11 times the radius of left second gear 108. Thus, left gear interface 106 provides an 11:1 step-up in ratio;
3. Torque is third transmitted from left second gear 108 to left third gear 112 across left first step-up shaft 110. There is no change in the final drive ratio as these two gears 108,112 rotate on a common shaft at a common speed;
4. Torque is fourth transmitted from left third gear 112 to left fourth gear 116. This is referred to as left gear interface 114. The reader will note that the radius of left fourth gear 116 is approximately 1.6 times the radius of left third gear 112. Thus, left gear interface 114 provides a 1.6:1 step up in ratio;
5. Torque is fifth transmitted from left fourth gear 116 to left fifth gear 120 across left second step-up shaft 118. There is no change in final drive ratio between the left fourth gear and the left fifth gear since these two gears rotate in unison on a common shaft;
6. Torque is sixth transmitted from left fifth gear 120 to left sixth gear 127 (on output hub 128). This is referred to as left gear interface 126. The reader will note that the radius of left fifth gear 120 is approximately 1.6 times that of left sixth gear 127. Thus, left gear interface 126 provides a 1.6:11 step-up ratio; and
7. Output hub 128 forms part of the rear bicycle wheel, so torque transmitted to output hub 128 is torque transmitted to the rear wheel.

From this description the reader will perceive how the inventive transmission provides a substantial step-up ratio from a crank 40 to output hub 128. The step-up ratio between these components is 11*1.6*1.6, or 28.16:1.

As stated previously, the right side components of the transmission are a mirror image of the components just described for the left side. Right crank 36 moves independently of left crank 40. Right one-way clutch 92 transmits torque from right crank 36 to right input shaft 96 when right crank 36 is pushed downward. Right input shaft 96 rotates on bearings 100. The right input shaft includes right gear flange 104. A set of step-up gears are located by right carrier 124. They operate in the same manner as the step-up gears on the left side. The reader will thus perceive how output hub 128 rotates with the bicycle wheel and the inventive transmission selectively applies torque from a particular crank, through the geartrain, and to the output hub (whenever a particular crank is pushed down).

It is advantageous to transmit the torque between input shafts 94 and output hub 128 through multiple gear sets. This allows greater torque-carrying capacity and also serves to geometrically stabilize the gear sets. Still looking at FIG. 5, the reader will note again how the left and right transmission sets are mirror images of each other. The reader will also note an addition two gear sets located in the bottom portion of the view.

Figure 6:
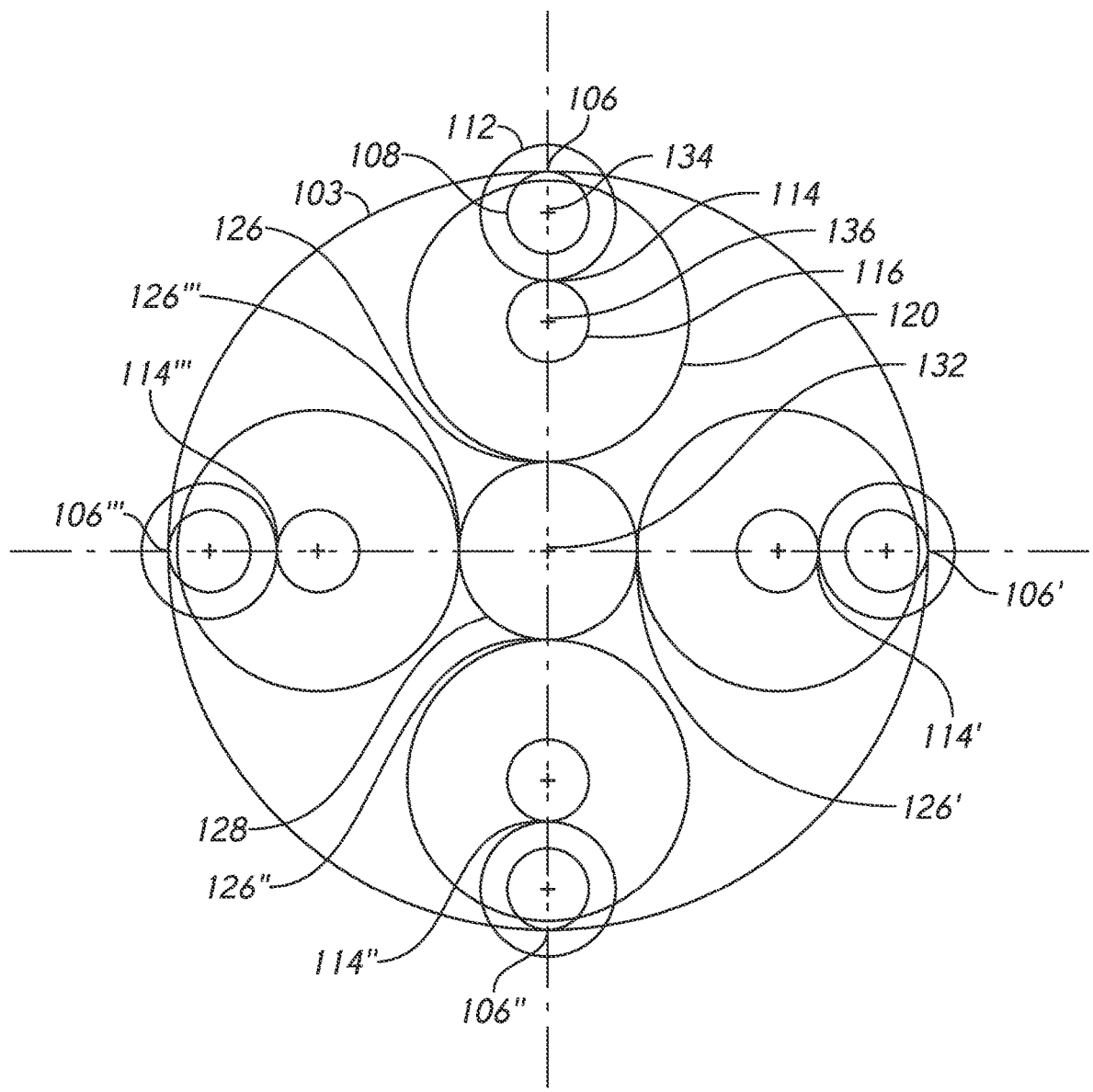
FIG. 6 is a schematic elevation view, showing the relationship between the gears within the inventive hub.

In fact, in the preferred embodiments, eight separate sets of step-up shafts and gears are used to transmit torque from input shafts 94,96 to output hub 128—four sets for the left crank and four sets for the right crank. FIG. 6 conceptually depicts the location of the four gear sets used to transmit torque from the left crank. Axle center 132—the center of rear axle 30—is in the middle of the plot. Gear interface 106 is the interface between first gear 103 and second gear 108. Gear interface 114 is the interface between third gear 112 and fourth gear 116. Gear interface 126 is the interface between fifth gear 120 and output hub 128. The corresponding interfaces for the second, third, and fourth gear sets linked to the left crank are marked with prime ('), double prime ("), and triple prime ("') designations.

Figure 7:
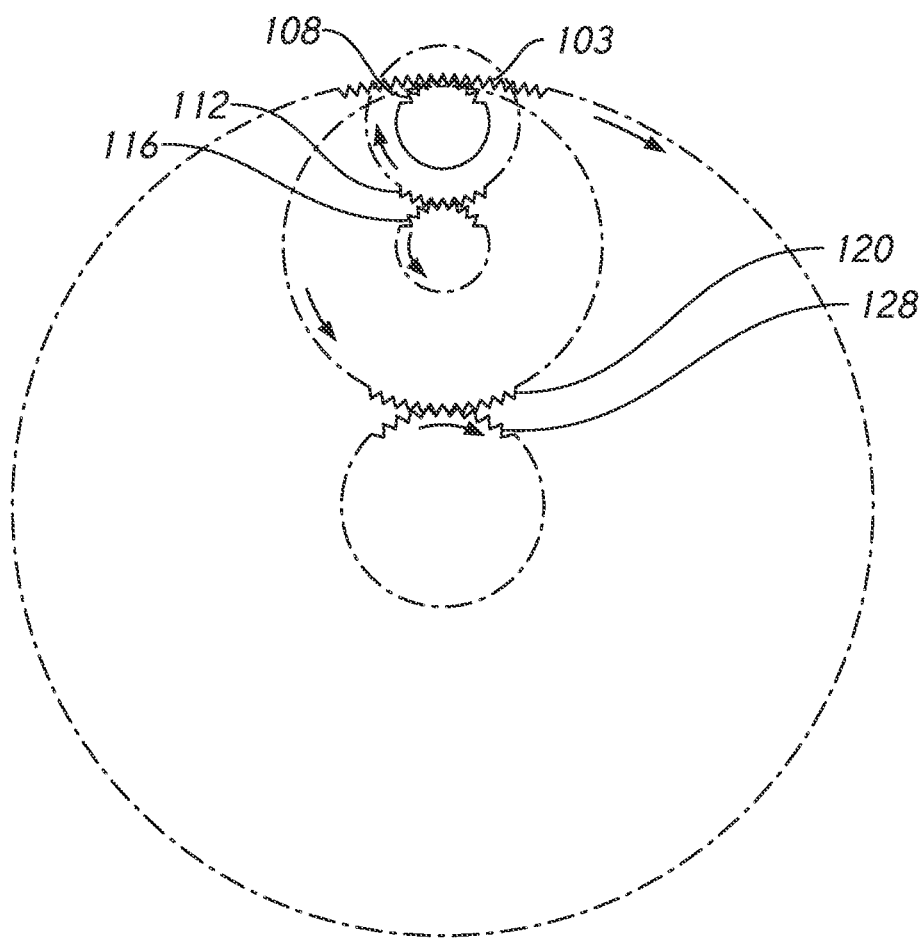
FIG. 7 is an elevation view, showing the relationship between the gears within the inventive hub.

FIG. 7 is an elevation view through the assembly, looking from the right side of the bicycle toward the left side. The figure shows the torque transmission path for only one of the gear sets. First gear 103 travels in the clockwise direction (receiving torque from a descending crank, which is also rotating in a clockwise direction when descending). Second gear 108 and third gear 112 also rotate in the clockwise direction. Fourth gear 116 and fifth gear 120 rotate in the anti-clockwise direction. Output hub 128 rotates in the clockwise direction. Thus, the driving direction for the crank produces the desired direction for the output hub.

Figure 8:
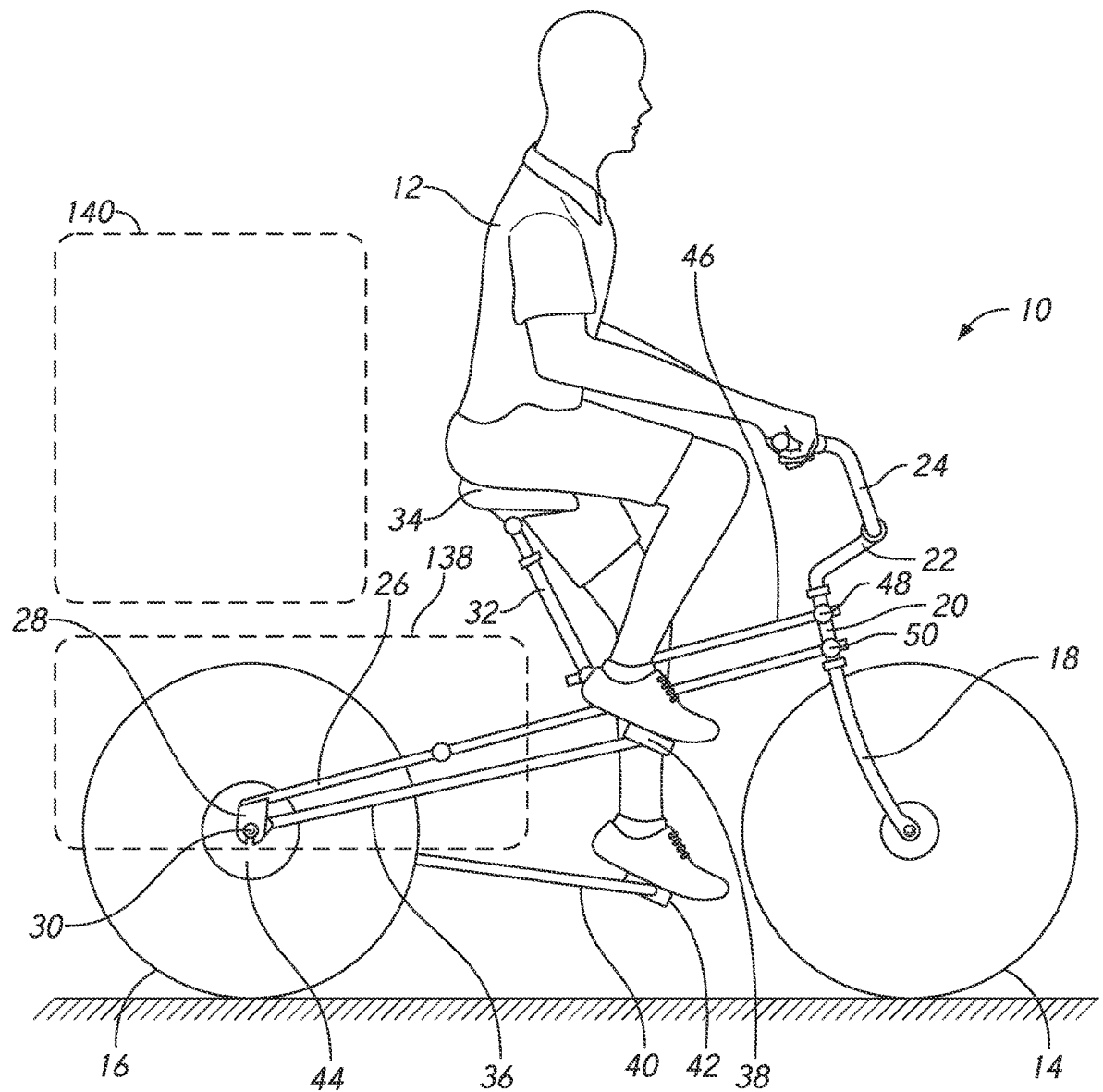
FIG. 8 is an elevation view, showing a user riding an alternate embodiment of the present invention.

As discussed previously, the use of the hub-mounted transmission allows great flexibility in the design of the bicycle frame. FIG. 8 shows another exemplary embodiment in which a longer lower span tube 26 is used to give the bicycle an extended wheelbase. Extended cranks 36,40 are also used so that pedals 38,40 remain in their proper position below the rider. The use of the longer cranks allows even greater torque input. In this version it may be desirable to provide a higher overall step-up ratio for the transmission, since the travel arc for each crank is somewhat reduced compared to the version of FIG. 1.

The extended wheelbase allows for the addition of package frame 138 over the rear wheel. A bulky package 140 can be carried on package frame 138 without impairing the rider's ability to balance, pedal, and steer.

Many other features and options are possible for the embodiments, including the following:
1. The step-up shafts and associated gears can be made as one integral piece or as an assembly of separate components;
2. Many complex pieces—such as output hub 128—may be made as an assembly of simpler components;
3. Many of the inventive components can be split or modified to facilitate manufacturing and/or assembly;
4. Lateral locating features can be added to the components;
5. The gear ratios can be altered by altering the sizes of the gears used to transmit torque; and
6. Upward motion of the cranks can be produced by the user pulling up on the pedal (with the addition of a toe clip or strap over the top of the foot). Alternatively, a rocker mechanism can be added between the cranks so that pushing down on one crank raises the other crank.

Although the preceding descriptions present considerable detail they should be properly viewed as illustrating preferred embodiments of the present invention rather than limiting the scope of the invention. Many more embodiments following the same principles will occur to those skilled in the art. Accordingly, the scope of the invention should be fixed by the following claims rather than by the examples given.

Having described my invention, I claim:

1. A combination cycle transmission and hub configured to attach to a frame of a cycle, comprising:
   (a) a stationary axle attached to said frame and having an axle center;
   (b) a left input shaft rotationally mounted on said stationary axle;
   (c) a left crank;
   (d) a left one-way clutch connecting said left crank to said left input shaft;
   (e) a left carrier secured in a stationary position with respect to said stationary axle;
   (f) said left input shaft having a left gear flange including a left first gear;
   (g) a left first step-up shaft rotationally mounted to said left carrier, with said left first step-up shaft mounting a left second gear and a left third gear;
   (h) a left second step-up shaft rotationally mounted to said left carrier, with said left second step-up shaft mounting a left fourth gear and a left fifth gear;
   (i) an output shaft rotationally mounted on said left input shaft;
   (j) said output shaft including a left sixth gear;
   (k) said left first gear being engaged to said left second gear;
   (l) said left third gear being engaged to said left fourth gear;
   (m) said left fifth gear being engaged to said left sixth gear; and
   (n) said output shaft being a hub in a wheel of said cycle.

2. The combination cycle transmission and hub as recited in claim 1, further comprising a plurality of spokes extending outward from said hub.

3. The combination cycle transmission and hub as recited in claim 2, wherein said output shaft includes a spoke flange.

4. The combination cycle transmission and hub as recited in claim 1 wherein said hub and said output shaft are formed as one integral piece.

5. The combination cycle transmission and hub as recited in claim 1, further comprising:
   (a) a right input shaft rotationally mounted on said stationary axle;
   (b) a right crank;
   (c) a right one-way clutch connecting said right crank to said right input shaft;

(d) a right carrier secured in a stationary position with respect to said stationary axle;
(e) said right input shaft having a right gear flange including a right first gear;
(f) a right first step-up shaft rotationally mounted to said right carrier, with said right first step-up shaft mounting a right second gear and a right third gear;
(g) a right second step-up shaft rotationally mounted to said right carrier, with said right second step-up shaft mounting a right fourth gear and a right fifth gear;
(h) said output shaft including a right sixth gear;
(i) said right first gear being engaged to said right second gear;
(j) said right third gear being engaged to said right fourth gear; and
(k) said right fifth gear being engaged to said right sixth gear.

6. The combination cycle transmission and hub as recited in claim 5, further comprising a plurality of spokes extending outward from said hub.

7. The combination cycle transmission and hub as recited in claim 6, wherein said output shaft includes a spoke flange.

8. The combination cycle transmission and hub as recited in claim 5 wherein said hub and said output shaft are formed as one integral piece.

9. The combination cycle transmission and hub as recited in claim 6 wherein said hub and said output shaft are formed as one integral piece.

10. The combination cycle transmission and hub as recited in claim 7 wherein said hub and said output shaft are formed as one integral piece.

11. A transmission configured to attach to a frame of a cycle, comprising:
(a) an axle attached to said frame and having an axle center;
(b) a left input shaft rotationally mounted on said axle;
(c) a left crank;
(d) a left one-way clutch connecting said left crank to said left input shaft;
(e) a left carrier secured in a stationary position with respect to said axle;
(f) said left input shaft having a left gear flange including a left first gear;
(g) a left first step-up shaft rotationally mounted to said left carrier, with said left first step-up shaft mounting a left second gear and a left third gear;
(h) a left second step-up shaft rotationally mounted to said left carrier, with said left second step-up shaft mounting a left fourth gear and a left fifth gear;
(i) an output shaft rotationally mounted on said left input shaft;
(j) said output shaft including a left sixth gear;
(k) said left first gear being engaged to said left second gear;
(l) said left third gear being engaged to said left fourth gear;
(m) said left fifth gear being engaged to said left sixth gear; and
(n) said output shaft being a hub in a wheel of said cycle.

12. The combination cycle transmission and hub as recited in claim 11, further comprising a plurality of spokes extending outward from said hub.

13. The combination cycle transmission and hub as recited in claim 12, wherein said output shaft includes a spoke flange.

14. The combination cycle transmission and hub as recited in claim 11 wherein said hub and said output shaft are formed as one integral piece.

15. The combination cycle transmission and hub as recited in claim 11, further comprising:
(a) a right input shaft rotationally mounted on said axle;
(b) a right crank;
(c) a right one-way clutch connecting said right crank to said right input shaft;
(d) a right carrier secured in a stationary position with respect to said axle;
(e) said right input shaft having a right gear flange including a right first gear;
(f) a right first step-up shaft rotationally mounted to said right carrier, with said right first step-up shaft mounting a right second gear and a right third gear;
(g) a right second step-up shaft rotationally mounted to said right carrier, with said right second step-up shaft mounting a right fourth gear and a right fifth gear;
(h) said output shaft including a right sixth gear;
(i) said right first gear being engaged to said right second gear;
(j) said right third gear being engaged to said right fourth gear; and
(k) said right fifth gear being engaged to said right sixth gear.

16. The combination cycle transmission and hub as recited in claim 15, further comprising a plurality of spokes extending outward from said hub.

17. The combination cycle transmission and hub as recited in claim 16, wherein said output shaft includes a spoke flange.

18. The combination cycle transmission and hub as recited in claim 15 wherein said hub and said output shaft are formed as one integral piece.

19. The combination cycle transmission and hub as recited in claim 16 wherein said hub and said output shaft are formed as one integral piece.

20. The combination cycle transmission and hub as recited in claim 17 wherein said hub and said output shaft are formed as one integral piece.

\* \* \* \* \*